US008321918B2

(12) United States Patent
Cho et al.

(10) Patent No.: US 8,321,918 B2
(45) Date of Patent: Nov. 27, 2012

(54) APPARATUS AND METHOD FOR SHARING USER CONTROL ENHANCED DIGITAL IDENTITY

(75) Inventors: Sangrae Cho, Daejeon (KR);
Youngseob Cho, Daejeon (KR);
Jonghyouk Noh, Daejeon (KR);
Daeseon Choi, Daejeon (KR);
Soohyung Kim, Daejeon (KR);
Seunghyun Kim, Daejeon (KR);
Seunghun Jin, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 909 days.

(21) Appl. No.: 12/330,684

(22) Filed: Dec. 9, 2008

(65) Prior Publication Data

US 2009/0165103 A1 Jun. 25, 2009

(30) Foreign Application Priority Data

Dec. 21, 2007 (KR) ........................ 10-2007-0135185

(51) Int. Cl.
*G06F 7/04* (2006.01)
*G06F 17/30* (2006.01)
*H04L 29/06* (2006.01)
(52) U.S. Cl. ............................. 726/6; 726/26

(58) Field of Classification Search .................. None
See application file for complete search history.

(56) References Cited

U.S. PATENT DOCUMENTS

2005/0091495 A1* 4/2005 Cameron et al. .............. 713/175

OTHER PUBLICATIONS

Bosworth et al., "Entities, identities, identifiers and credentials—what does it all mean?", BT Technology Journal, vol. 23, No. 4, Oct. 2005, pp. 25-36.*
Josang et al., "Usability and Privacy in Identity Management Architectures," ACSW '07 Proceedings fo teh fifth Australasian symposium on ACSW frontiers, vol. 68, pp. 143-152.*

* cited by examiner

*Primary Examiner* — William Powers
(74) *Attorney, Agent, or Firm* — Ladas & Parry LLP

(57) ABSTRACT

The present invention provides an apparatus for sharing a user control enhanced digital identity that allows a user to have all controls and control the flow of identity sharing on the user basis when the user shares user's personal information. According to the present invention, a user can decrease infringement of personal information due to illegal usage of the personal information by allowing a user to control usage of user's personal information and prevent the user's personal information from being carelessly used. Further, a provider that provides the services can efficiently associate the services between providers.

12 Claims, 4 Drawing Sheets

APPARATUS AND METHOD FOR SHARING USER CONTROL ENHANCED DIGITAL IDENTITY

RELATED APPLICATIONS

The present application claims priority to Korean Patent Application Serial Number 10-2007-0135185, filed on Dec. 21, 2007, the entirety of which is hereby incorporated by reference.

BACKGROUND OF THE INVENTION

1. Field of the Invention

The present invention relates to an apparatus and method for sharing user control enhanced digital identity, and more particularly, to an apparatus for sharing user control enhanced digital identity, which grants user control for protecting user's privacy and a method therefore.

This work was supported by the IT R&D program of MIC/IITA [2007-S-601-01, Development of User Control Enhanced Digital Identity Wallet System].

2. Description of the Related Art

In the current Internet environment, phishing attacks, etc. can cause leakage of personal information and convenience and security are vulnerable due to various authentication methods and different personal information input methods for each site. Further, most sites requests more personal information than is necessary to provide an Internet service. All rights for controlling personal information are transferred to a service provider only by a general agreement with stipulations at the time of subscribing to the Internet site, such that there is a problem in that a user cannot control usage of the personal information. Accordingly, measures are needed for decreasing infringement of the personal information due to illegal usage of personal information by providing an intuitive and consistent authentication method, and enhancing the user control for the personal information.

Currently, with the rise of Web 2.0 that is oriented to sharing and opening of the information, a mash-up service based Internet business has becomes the new trend. Many large enterprises have started businesses relating to Web 2.0 that provides highly valuable services through information sharing, user's participation, and information opening. Further, it is expected that a mash-up service that converge contents and technologies into one will rapidly grow. However, problems such as an invasion of privacy and vulnerable security of an existing Web environment in relation to usage of the personal information have not been solved. Further, the fear of invasion of privacy due to the sharing of the personal information has increased.

Therefore, measures for protecting the personal information continuously accumulated in the Internet and protecting the privacy are required.

In order to solve the above-mentioned problems, the users have the following limits from a user's point of view at the time of applying an existing identity management technology. Users must still experience inconvenience to manage credentials issued from various sites. Further, since a privacy policy is different for each site, it is difficult for the users to appreciate and recognize such a policy. The users cannot control how their own information is distributed and used. Meanwhile, there is the following drawback from a service provider's point of view. Since a security policy and a privacy policy are different for each domain, it takes a long time and high cost to incorporate systems and services that have already built up in each domain. Further, in the case in which the number of domains to be shared is large, complexity thereof increases by geometric progression, such that it may be difficult to share the identity according to a provider's intention. Although common discrimination and representation styles of the identity in order to associate different services with service providers, contrivances for satisfying such a necessity have not yet been provided. Moreover, first of all, since interests among the service providers clash with each other, it is not easy to provide the services by using two different service providers.

SUMMARY OF THE INVENTION

The present invention has been finalized in order to solve the above-mentioned problems. Thus, a first object of the present invention is to provide an apparatus for sharing a user control enhanced digital identity that grants a user control for protecting a user's privacy in order to decrease infringement of user's personal information due to illegal usage of the user's personal information.

A second object of the present invention is to provide an apparatus for sharing a user control enhanced digital identity that provides collective discrimination and representation styles of an identity in order to efficiently share identity information between service providers and associate services between the providers.

A third object of the present invention is to provide an apparatus for sharing a user control enhanced digital identity, which has high extensibility and provides interoperability in sharing an identity by generating an identity interchange layer for sharing independent identity information in an existing application layer, that is, a network layer, and a method therefore.

An apparatus for sharing a user control enhanced digital identity according to the present invention includes a user interface unit that manages a user's identity, manages a credential required for an authentication, and allows the identity and the credential to be displayed to a user as screen information, in an application layer; and an identity interchanging service unit that performs sharing and synchronization of the identity between an identity provider and an identity consumer by modifying the user's identity in accordance with an application environment, in an identity interchange layer.

In particular, the user's identity is divided into a user profile that allows the user to be uniquely discriminated and a sharing identity that includes a sharing policy representing contract details to be observed in sharing.

Further, the identity interchanging service unit includes an authentication processing portion that performs a universal authentication function in order to support various authentication methods that are provided by the identity consumer.

Further, the authentication processing portion receives authentication mechanisms that may be admitted by the identity consumer and performs the universal authentication function by using one or more authentication mechanism.

Further, the identity interchanging service unit allows the user's identity to be shared between the identity provider and the identity consumer, and generates and digitally signs a digital contract containing regulations on the shared identity.

Further, the identity interchanging service unit manages a validity period of the digital contract.

Further, the digital contract includes one or more information among general terms, a purpose, attribute references, a security policy, and an access control policy.

Further, the identity interchanging service unit includes a token transformer that provides interoperability with another identity management system.

Further, the user interface unit manages the identity as a sharing identity when an identity sharing request signal is applied, and the sharing identity contains at least one of items of the shared identity and the contract details to be observed in sharing.

Further, the credential includes at least one of a password, a PKI (Public Key Infrastructure), and biological information, and the user interface unit manages and stores the credential as a credential card.

A method for sharing a user control enhanced digital identity according to the present invention includes managing a user's identity and managing a credential required for an authentication, in an application layer; and sharing and synchronizing the identity between an identity provider and an identity consumer by modifying the user's identity in accordance with an application environment, in an identity interchange layer.

In particular, the user's identity is divided into a user profile that allows the user to be uniquely discriminated and a sharing identity that includes a sharing policy representing contract details to be observed in sharing.

Further, the sharing and synchronizing the identity includes receiving authentication mechanisms that may be admitted by the identity consumer and performing the universal authentication function by using one or more authentication mechanism.

Further, the sharing and synchronizing the identity includes allowing the user's identity to be shared between the identity provider and the identity consumer, and generating and digitally signing a digital contract containing regulations on the shared identity.

Further, the digital contract includes one or more information among general terms, a purpose, attribute references, a security policy, and an access control policy.

Further, the managing the user's identity and managing the credential required for the authentication includes managing the identity as a sharing identity when an identity sharing request signal is applied and the sharing identity contains at least one of items of the shared identity and the contract details to be observed in sharing.

Further, the managing the user's identity and managing the credential required for the authentication includes managing an storing the credential as a credential card, and the credential includes at least one of a password, a PKI (Public Key Infrastructure), and biological information.

In an apparatus for sharing a user control enhanced digital identity and a method therefore according to the present invention, it is possible to expect the following advantages.

A user can decrease infringement of personal information due to illegal usage of the personal information by allowing a user to control usage of their own personal information. In addition, it is possible to prevent the user's personal information from being carelessly used and to protect a user's privacy.

Further, according to the present invention, it is possible to efficiently associate the service between service providers that provide an Internet service.

DESCRIPTION OF THE PREFERRED EMBODIMENT

Figure 1:
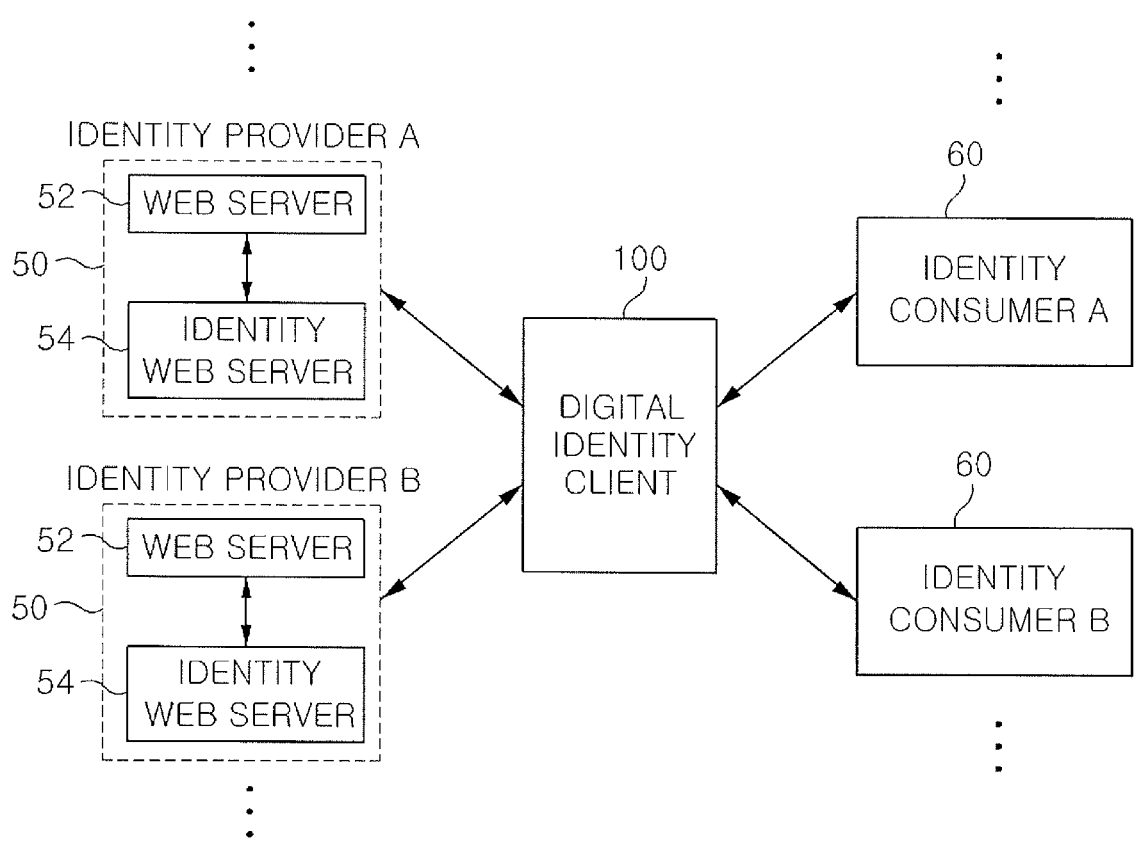
FIG. 1 is a block diagram illustrating a service environment where an apparatus for sharing a user control enhanced digital identity is embodied according to an exemplary embodiment of the present invention.

Hereinafter, the present invention will be described in detail with reference to the accompanying drawings. Herein, the detailed description of a related known function or configuration that may make the purpose of the present invention unnecessarily ambiguous in describing the present invention will be omitted. Exemplary embodiments are provided so that those skilled in the art may more completely understand the present invention. Accordingly, the shape, the size, etc., of elements in the figures may be exaggerated for explicit comprehension. Like reference numerals refer to like elements throughout.

Hereinafter, an apparatus for sharing a user control enhanced digital identity and a method therefore according to preferred embodiments of the present invention will be described in detail with reference to the accompanying drawings.

FIG. 1 is a block diagram illustrating a service environment where an apparatus for sharing a user control enhanced digital identity is embodied according to an exemplary embodiment of the present invention.

As shown in FIG. 1, a digital identity sharing apparatus according to the present invention includes a digital identity client 100, web servers 52, and identity web servers 54.

The apparatus for sharing a user control enhanced digital identity operated, for example, under a web environment. The embodied service environment generally has a client/server form. More specifically, a server side which is identity providers 50 or identity consumers 60 are constituted by the web servers 52 and the identity web servers 54, and a client as a service requester is constituted by the digital identity client 100 that is in link with a web browser.

First, the digital identity client 100 that is in link with the web browser on the client side will be described.

The digital identity client 100 is called by the web browser, and processes subscription of a web site for receiving a predetermined service and a withdrawal from the web site. Further, the digital identity client 100 has a plurality of identities of users. In general, the identities as information representing characteristics of individuals means user information that are issued from or registered in an institution such as a government or a company, such as a company address, a home address, a telephone number, or a family, an academic career, religions, etc. and information by which the individuals can be uniquely discriminated.

The digital identity client 100 allows the identities to be shared by the identity providers 50 or the identity consumers 60 that request the identities of the users, and synchronizes the sharing of the identities and manages credentials. The identities of all the users are shared by the identity providers 50 or the identity consumers 60 through the digital identity client 100. Accordingly, the user can control that the user's own identity is shared by the identity providers 50 or the identity consumers 60. In general, the credentials represent information used as a means for certifying that an individual is a member of a predetermined community or himself/herself to another entity, such as a password, a certificate, and a security token.

Figure 2:
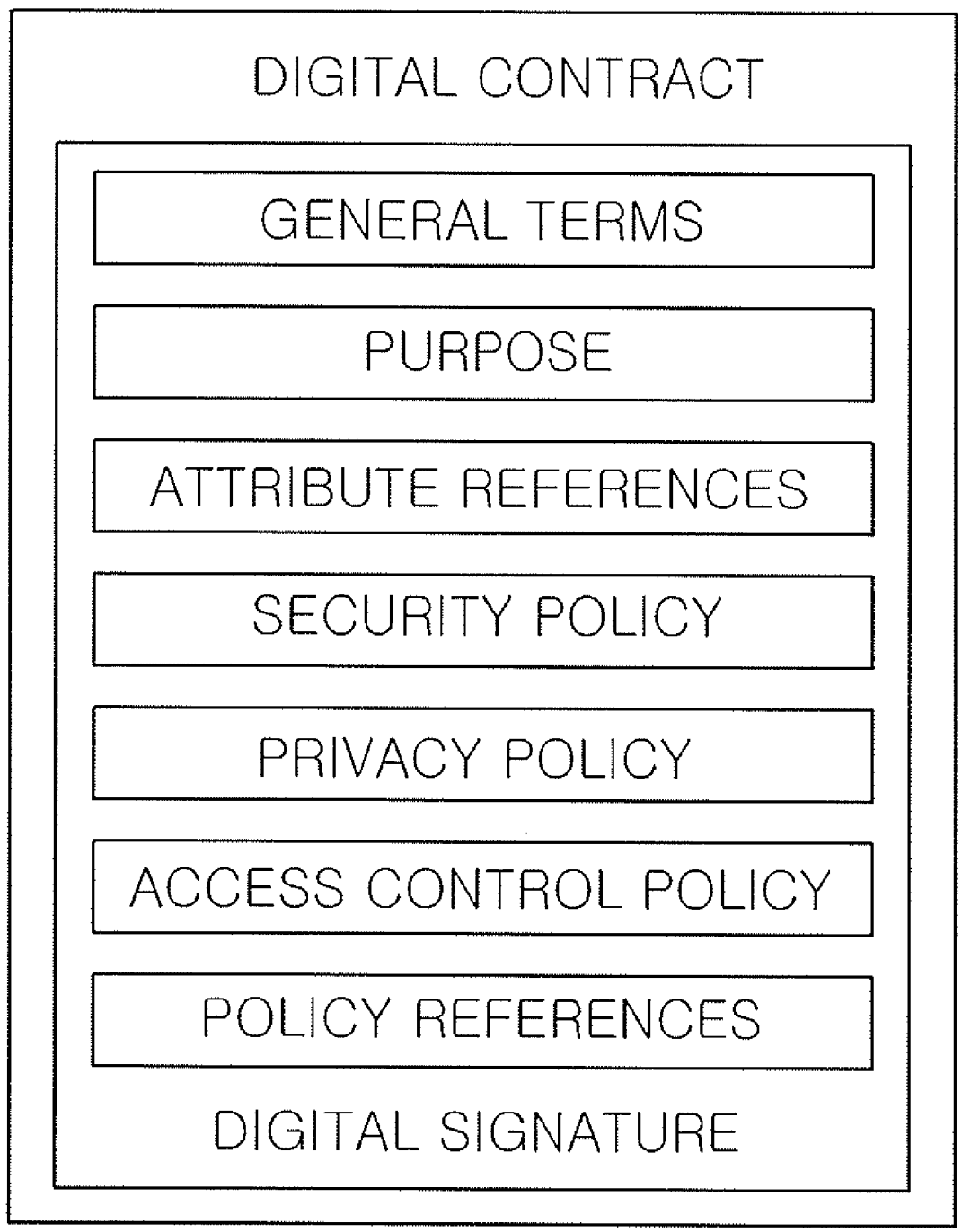
FIG. 2 is a diagram illustrating one example of a digital contract applied to the present invention.

The digital identity client 100 allows the identities of the users to be shared by the identity providers 50 or the identity consumers 60 in accordance with a digital contract shown in FIG. 2 below. The digital contract may be formed of an XML document. Accordingly, the user can control the flow of the user's own identity by updating and modifying the digital contract like a written contract existing in user's real life. However, the digital contract according to the present invention is not always required when the digital identity client 100 allows the identity of the user to be shared. The user can control that the user's own identity is shared in accordance with the above-mentioned digital contract as necessary. As shown in FIG. 2, the digital contract may include general terms, a purpose, attribute references, a security policy, a privacy policy, an access control policy, other policy references, a signature, etc. More specifically, the general terms may include version information, a contract date, a validity period, a notice, etc. Further, for example, DAC, MAC, RBAC, etc. may be used as the access control policy.

Meanwhile, all the matters may not included in the digital contract and may be selectively written in the digital contract as necessary. However, it is preferable that the general terms, the purpose, the security policy, the privacy policy, and the signature are essentially written in the digital contract.

Next, the web server 52 and the identity web server 54 at the server side will be described.

The server side includes the web servers 52 and the identity web servers 54.

The identity web server 54 processes the subscription of the web site, universal authentication, identity sharing, synchronization, etc. by using the digital identity client 100. At this time, the identity web server 54 manages identity information of the identity provider 50 in accordance with the digital contract. The digital contract contains regulations on authentication of the shared identity information, an access control, and the privacy policy.

Figure 3:
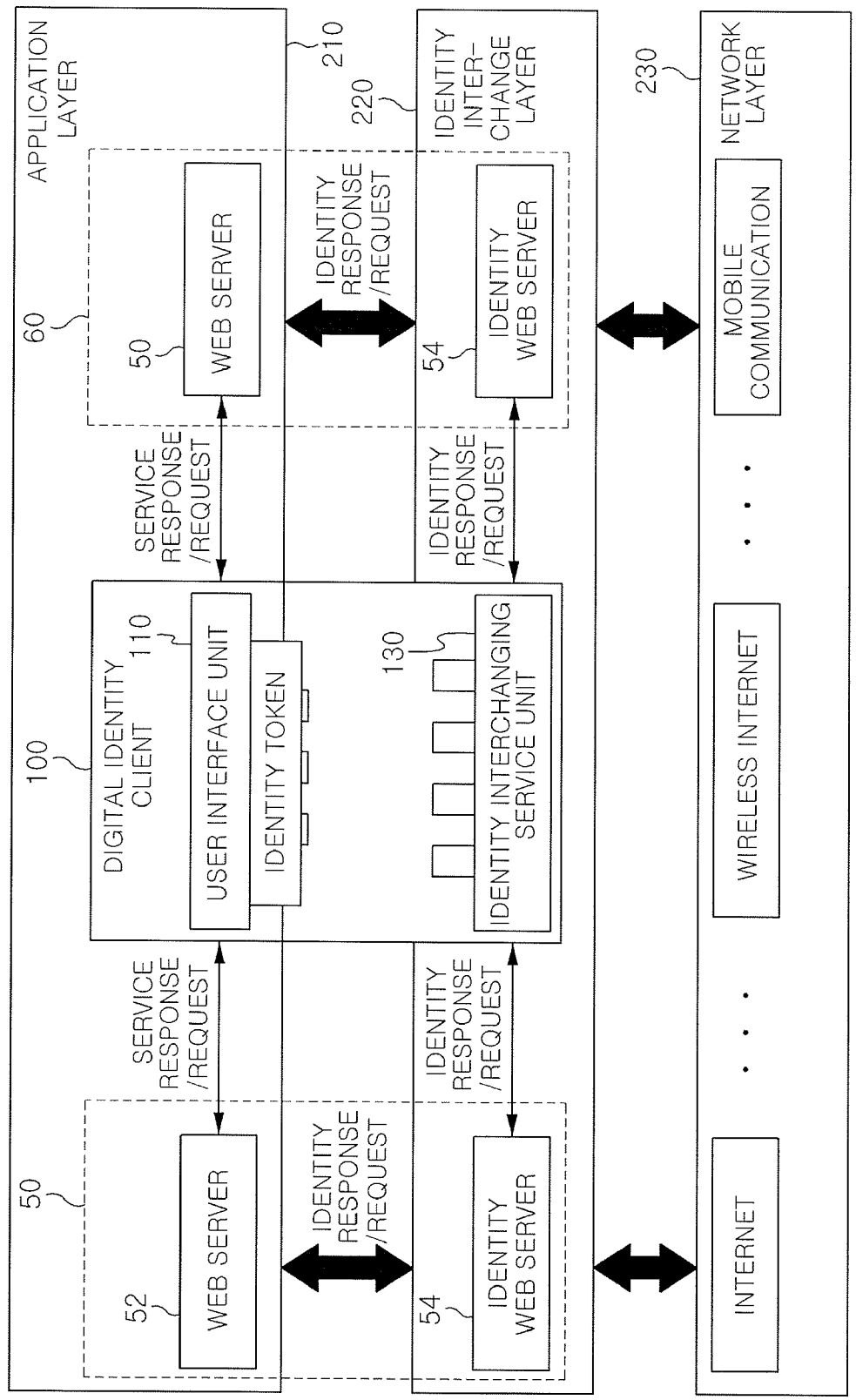
FIG. 3 is a block diagram illustrating an identity interchange layer which is an essential concept of a framework in which the apparatus for sharing the user control enhanced digital identity is embodied according to an exemplary embodiment of the present invention.

FIG. 3 is a block diagram illustrating an identity interchange layer which is an essential concept of a framework in which the apparatus for sharing the user control enhanced digital identity is embodied according to an exemplary embodiment of the present invention.

First, the identity providers 50 store and manage the identities of the users, and provide the identities of the users when the digital identity client 100 or the identity consumers 60 request the identities.

The identity consumers 60 request the identities of the users to the digital identity client 100 to receive the identities of the users and provide a predetermined service to the users by using the received identities.

Herein, it is apparent that roles of the identity provider (hereinafter, referred to as "IdP") 50 and the identity consumer (hereinafter, referred to as "IdC") 60 may be changed in accordance with providing or receiving the identities of the users.

Hereinafter, referring to FIG. 3, the identity interchange layer which is the essential concept of the framework in which the digital identity sharing apparatus according to the present invention will be described.

Since the identities of the users are collectively shared in an application layer, the identity information, the known digital identity sharing apparatus has an inefficient structure in which the identity information must be integrated for each application system for sharing. However, in the present invention, the digital identity sharing apparatus has a structure that is constituted by an application layer 210, an identity interchange layer 220, and a network layer 230. That is, in the present invention, it is possible to independently develop and operate the identity information by using the above-mentioned three independent layers at the time of managing the identity information. As a result, there is an advantage in that an apparatus that is more adaptable, is extensible, and assures interoperability can be developed.

When the identity interchange layer 220 requests the identity of the user, which is required for an application service, to the identity web server 54, the identity interchange layer 220 supports a interchanging service that allows the identity of the user to be shared.

Further, the network layer 230 can support the interchanging service to allow the identity of the user to be efficiently and easily shared by using various communication methods such as the Internet, a mobile communication, and a wireless communication that exist at present. This is because a link management is performed so that the identity is transmitted in the identity interchange layer 220.

Meanwhile, the apparatus for sharing the user control enhanced digital identity according to the exemplary embodiment of the present invention is designed on the basis of a principle described below in order to efficiently share user's personal information under various computer environments.

(1) Independent—The apparatus for sharing the user control enhanced digital identity must not be operated by being subordinate to a predetermined application or network. Therefore, the apparatus for sharing the user control enhanced identity according to the exemplary embodiment must be designed to be operated by being applied to various environments.

(2) Pluggable—The user has and uses various devices under a mobile or ubiquitous computing environment. In this case, the user needs information to discriminate the user and sharing the identity of the user in a predetermined device. The information must be designed in a safe and standardized structure that may be applied to all devices.

(3) Flexible—The apparatus for sharing the user control enhanced digital identity according to the exemplary embodiment must be designed to be applied to various environments from small-size mobile devices to large-size workstations. This represents that the digital identity sharing apparatus must be figured to be applied to all environments under any environment.

(4) Scalable—The apparatus for sharing the user control enhanced digital identity according to the exemplary embodiment must assure extensibility without imposing a new communication or computing load to be used for sharing the personal information between domains from the small-sized domains.

(5) Interoperable—The apparatus for sharing the user control enhanced digital identity according to the exemplary embodiment of the present invention must provide a function to give interoperability with the existing ID management systems.

Figure 4:
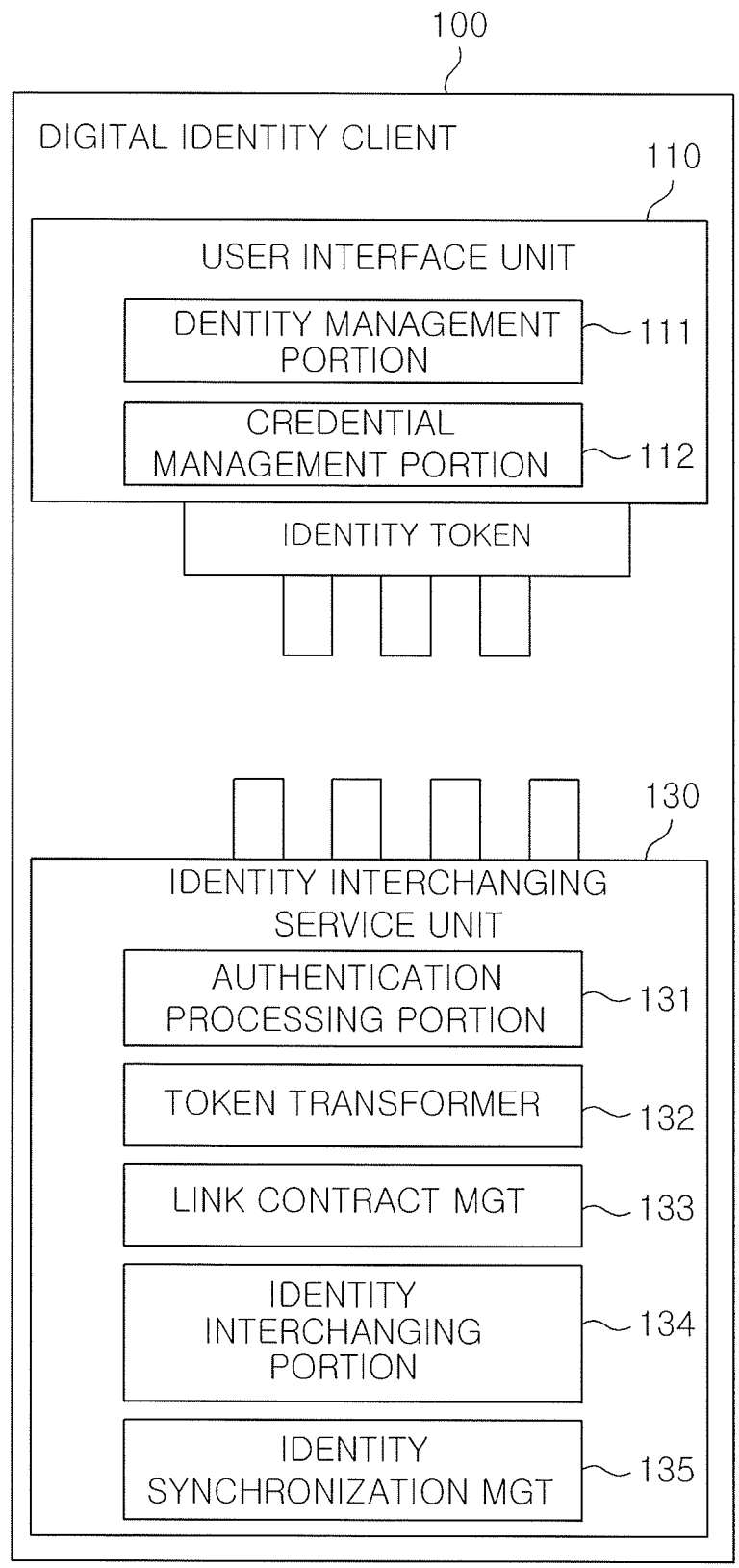
FIG. 4 is a block diagram illustrating the internal configuration of the digital identity client 100 corresponding to the apparatus for sharing the user control enhanced digital identity according to the exemplary embodiment of the present invention that satisfies the above-mentioned design principle.

FIG. 4 is a block diagram illustrating the internal configuration of the digital identity client 100 included in the apparatus for sharing the user control enhanced digital identity according to the exemplary embodiment of the present invention that satisfies the above-mentioned design principle.

The digital identity client 100 connects the IdP 50 and the IdC 60 to each other to allow the IdP 50 and the IdC 60 to exchange the identities. That is, the digital identity client 100 sets a link to allow the Idp 50 to transmit the identities to the IdC 60. The user can extract and update the user's own identity at any time by using the previously connected link.

The digital identity client 100 includes a user interface unit 110 and an identity interchanging service unit 130.

The user interface unit 110 includes an identity management portion 111 that manages the identity of the user and a credential management portion 112 that manages the credential. The user interface unit 110 allows the identity and credential of the user to be displayed to the user as screen information.

More specifically, the identity management portion 111 manages the identity of the user. At this time, the identity of the user is divided into a profile and a sharing identity. The above-mentioned profile represents user information (i.e., a name, a registration number, a telephone number, an address, etc.) generally provided at the time of subscribing to the web site and the sharing identity represents a regulation and data for sharing information generated between the user and a predetermined web site.

The identity management portion 111 receives the user information from the user to generate the above-mentioned profile, and stores and manage the profile generated by such a method in the form of an identity card. Therefore, the user can provide the information by using the identity card stored in the identity management portion 111 without inputting the user's own information at the time of subscribing to a predetermined web site. Of course, the stored profile may be modified through the identity management portion 111. Meanwhile, if sharing an identity generated when the user uses the web site is required, the identity management portion 111 manages information on the identity as the sharing identity. The sharing identity includes items of the shared identity, a sharing policy showing contract details to be observed in sharing the identity, etc.

Further, the credential management portion 112 performs a credential management required for an authentication when the user accesses a predetermined web site that requires a user authentication. At this time, the credential designates a password, a PKI (Public Key Infrastructure), and biological information that are submitted to the web site when the user performs the authentication by using the digital identity client 100. In this case, the credential is divided into the password, the PKI, and the biological information, and is managed and stored as a credential card.

The credential management portion 112 performs operations such as an inquiry, modification, deletion, generation, and etc. of the credential. As described above, when the user logs in the predetermined web site that requires the authentication, the user can perform the authentication by selecting the credential card corresponding to the web site through the credential management portion 112 of the digital identity client 100.

An identity interchanging service unit 130 allows the identities to be shared and synchronized between the IdP 50 and the IdC 60 by modifying the identity in accordance with the application environment regardless of a communication network environment.

In order to perform the above-mentioned operation, the identity interchanging service unit 130 includes an authentication processing portion 131, a token transformer 132, a link contract Mgt. 133, an identity interchanging portion 134, and an identity synchronization Mgt. 135.

The authentication processing portion 131 performs a universal authentication function in order to support a variety of authentication methods provided by the web site. Accordingly, the authentication processing portion 131 supports a variety of authentication mechanisms. That is, the authentication processing portion 131 negotiates an authentication mechanism to be used thereafter when the user subscribes to the web site by using digital identity client 100. More specifically, the authentication processing portion 131 receives an authentication mechanism list that can be admitted by a predetermined web site that provides services from the web site and outputs the authentication mechanism list as screen information so that the use can see the authentication mechanism list. Thereafter, the authentication processing portion 131 outputs the authentication mechanism list and negotiates one or more authentication mechanism selected by the user. The universal authentication may be used when the user logs in a predetermined web site or the user uses a service that requires a high-level security at the time of using the web site. Further, a two-factor authentication may be used at any web side. In the case of the server, the authentication represents a sharing authentication that authenticates each object in sharing.

The token transformer 132 provides interoperability with another ID management system. Basically, most ID management systems use the token in order to exchange security information or the user's identity. In this case, the token transformer 132 provides a service to convert all tokens input into and output from the digital identity client 100 to a format that the digital identity client 100 can appreciate.

The link contract Mgt. 133 allows the user's identity to be interchanged between the IdP 50 or the IdC 60 and the digital identity client 100. The link contract Mgt. 133 generates and digitally signs a digital contract containing regulations on an authentication of the shared identity, an access control, a privacy protection, etc., and provides a function to manage a validity period of the digital contract. The digital identity client 100 inquires the digital contract whenever sharing the user's identity to determine whether or not the user conforms to a predetermined set policy. Accordingly, the digital identity client 100 according the present invention can control the flow of the personal information by using the digital contract.

The identity interchanging portion 134 allows the identity to be interchanged. More specifically, the identity interchanging portion 134, which is the most essential component of the digital identity client 100, provides a mechanism in which the identities are shared between the digital identity client 100 and the web site. The identities are shared between digital identity client 100 and the IdP 50 that provides the identities or between the digital identity client 100 and the IdC 60 that uses the identities. Meanwhile as described above, the identity management portion 111 manages the identity information as the sharing identity.

The identity synchronization Mgt. 135 allows the user's identity to be synchronized. More specifically, the IdP 50 or the IdC 60 has the user's identity and when the identity is changed by the user thereafter, a changed user's identity is reflected to the IdP 50 or the IdC 60. A detailed function includes set-up, execution, and release functions of the identity synchronization.

Meanwhile, the IdP 50 and the IdC 60 operate in link with each other so that the operation of the digital identity client 100 is performed. Further, the IdP 50 and the IdP 60 solve privacy related problems that may occur in sharing the user's identity. That is, the IdP 50 manages all contents that the user agrees with by using the privacy protection function. Further, the IdP 50 may provide a service to execute various privacy protection policies in link with the line contract.

In addition, the IdP 50 and the IdC 60 determines an authorization by checking a user's right and controls an access to a user's system in accordance with the determination. The above-mentioned service may be selectively applied and various access control mechanisms that are provided at present may be used.

As described above, although preferred embodiments of the present invention have been shown and described, the present invention is not limited to the above-mentioned embodiments. It will be apparent to those skilled in the art that various modifications and changes may be made without departing from the scope and spirit of the present invention, and all changes and modifications that fall within metes and bounds of the claims, or equivalents of such metes and bounds are therefore intended to be embraced by the claims.

What is claimed is:

1. An apparatus for sharing a user control enhanced digital identity, comprising:
    a user interface unit that allows an identity and a credential to be displayed to a user as screen information, wherein said identity is an information identifying the user and said credential is required for an authentication of the user; and
    an identity interchanging service unit that receives the identity from an identity provider which manages the identity, and transmits the identity to an identity consumer which provides a service to the user by using the identity, and performs sharing of the identity between the identity provider and the identity consumer,
    wherein the identity interchanging service unit manages a digital contract containing regulations on the shared identity so that the user controls the sharing of the identity between the identity provider and the identity consumer.

2. The apparatus according to claim 1, wherein the identity interchanging service unit performs synchronization of the shared identity between the identity provider and the identity consumer when the identity stored in the identity provider is changed by the user.

3. The apparatus according to claim 2, where the digital contract includes one or more among general terms, a purpose, attribute references, a security policy, an access control policy, and a digital signature of the user representing an agreement for the digital contract containing regulations on the shared identity.

4. The apparatus according to claim 3, wherein the identity interchanging service unit manages a validity period of the digital contract.

5. The apparatus according to claim 4, wherein the user interface unit manages and stores the identity as an identity card, and provides the information identifying the user to the identity consumer by using the stored identity card.

6. The apparatus according to claim 5, wherein the identity interchanging service unit performs a universal authentication function in order to support various authentication methods that are provided by the identity consumer.

7. The apparatus according to claim 6, wherein the identity interchanging service unit provides interoperability by transforming a token issued from another identity management system in order to exchange the identity for the user.

8. A method for sharing a user control enhanced digital identity, comprising:
    receiving an identity from an identity provider managing the identity, wherein said identity is an information identifying a user;
    displaying the identity received from the identity provider and a credential to the user as screen information, wherein said credential is required for an authentication of the user;
    managing a digital contract containing regulations on sharing of the identity so that the user controls the sharing of the identity between the identity provider and an identity consumer which provides a service to the user by using the identity;
    sharing the identity between the identity provider and the identity consumer by transmitting the identity to the identity consumer according to the digital contract.

9. The method according to claim 8, further comprising synchronizing the shared identity between the identity provider and the identity consumer when the identity stored in the identity provider is changed by the user.

10. The method according to claim 9, wherein the digital contract includes one or more among general terms, a purpose, attribute references, a security policy, an access control policy, and a digital signature of the user representing an agreement for the digital contract containing regulations on the sharing of the identity.

11. The method according to claim 10, wherein the managing the digital contract containing regulations on the sharing of the identity comprises managing a validity period of the digital contract.

12. The method according to claim 11, wherein the identity is managed and stored as an identity card, and is provided to the identity consumer as the information identifying the user.

* * * * *